March 29, 1955 P. L. TORRE 2,705,155
RESILIENT SUSPENSION SYSTEM FOR MOTORCYCLE WHEELS
Filed June 8, 1951 2 Sheets-Sheet 2

INVENTOR
PIER LUIGI TORRE
BY Young, Emery &
Thompson
ATTORNEYS

United States Patent Office 2,705,155
Patented Mar. 29, 1955

2,705,155

RESILIENT SUSPENSION SYSTEM FOR MOTORCYCLE WHEELS

Pier Luigi Torre, Milan, Italy

Application June 8, 1951, Serial No. 230,604

Claims priority, application Italy June 14, 1950

1 Claim. (Cl. 280—284)

The present invention relates to resilient suspension systems for motorcycle wheels making use of torsion bars.

It is known how to make use of torsion bars for the resilient suspension of motorcycle wheels; said application having proved to be most sound, both from the point of view of simplicity and light weight of the vehicle, and of the possibility to result in a very compact design. Said application however presents often some troubles of adaptation on the wheel supporting structures.

It is the main object of the present invention to introduce several improvements and practical measures that make it possible to install the torsion bars in a very limited space, and still obtain a good resilient action, even featuring a progressive stiffening with an increase of the elastic displacement.

Figure 1:
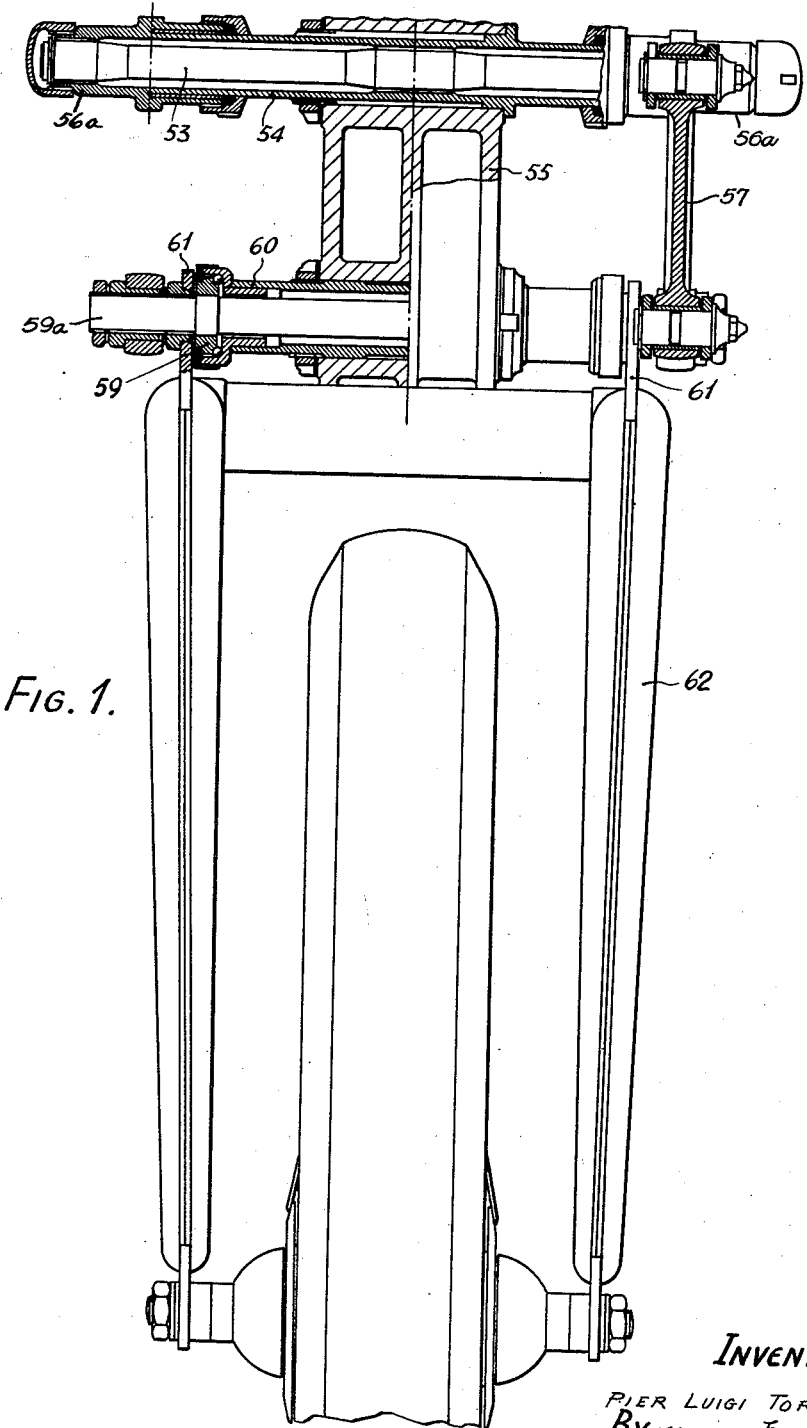
Fig. 1 is a fragmentary front view, partly in section, of a motorcycle rear wheel suspension constructed according to the present invention.
Figure 2:
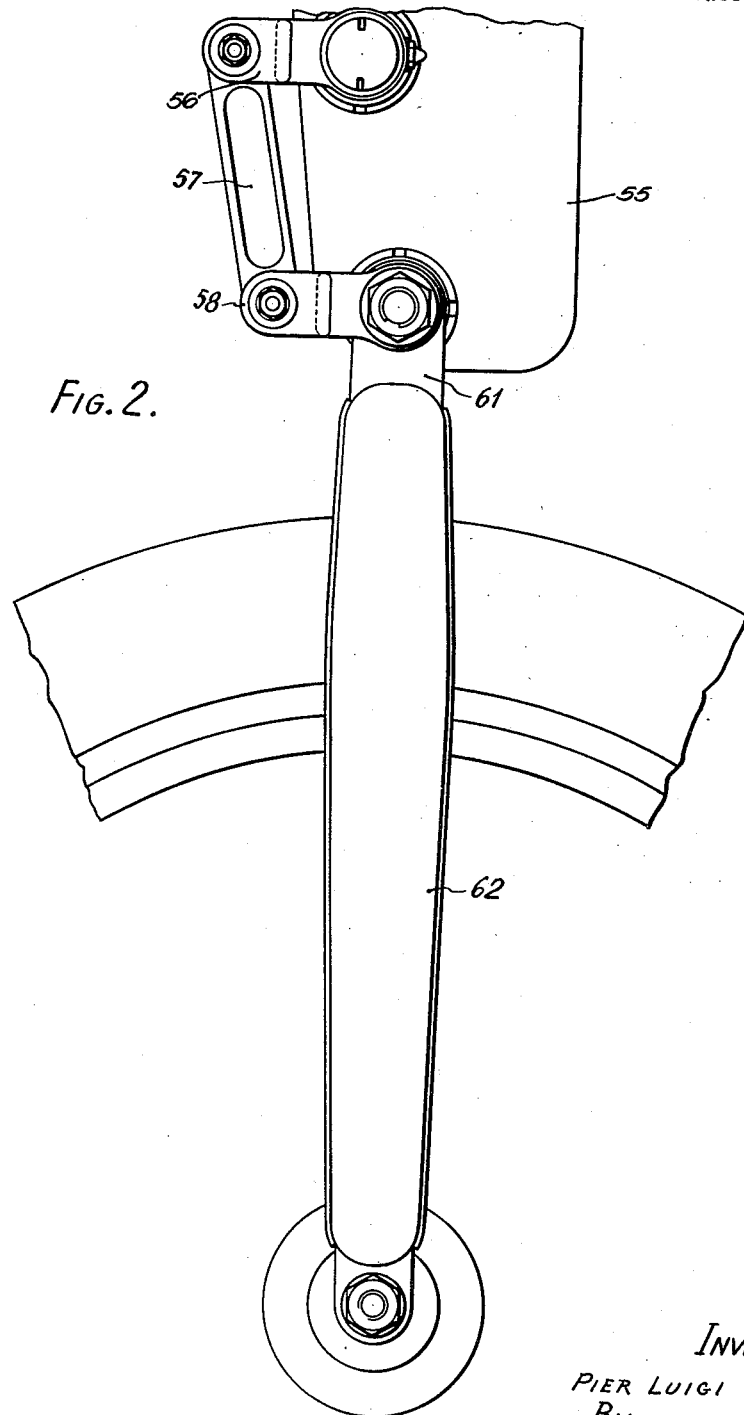
Fig. 2 is a side view of the structure of Fig. 1.

Figs. 1 and 2 show a construction of the resilient suspension for the rear wheel of a motorcycle wherein the rear forks 62 are carried by arms 61 which are pivotally mounted to swing about the axis of a shaft 59a mounted by bearings 59 in a sleeve or bushing 60 parallel to the wheel axis and carried by housing 55. Arms 61 are fixedly connected to arms 58, also pivotally mounted to swing about the axis of shaft 59a. As shown in Fig. 2 arms 58 extend at an angle to the forks 62 and the arms 61.

Above the sleeve 60 is another sleeve or bushing 54 parallel thereto and mounted in the housing 55. A torsion bar 53 is rigidly locked at its center in the sleeve or bushing 54, the two ends of the torsion bar being splined to receive the splined hubs 56a of two arms 56, said hubs being journaled on the outer ends of sleeve or bushing 54.

The free ends of arms 56 are connected by links 57 to the free ends of arms 58.

During the springing operation, for each upward displacement of the wheel, supported on the fork 62, there corresponds an upward rotation of the levers 58, connected with said fork, said rotation being transmitted by links 57 to the levers 56, which in turn transmit a twisting action on the bar, locked to same.

By suitably varying the length of the small links 57, and consequently the relative position of the levers 56 and 58, as well as their lengths, it is possible to obtain both a variation of the ratio in the angular displacement, of the bar, relative to the wheel movement, and a progressive increasing resistance.

While I have shown and described one particular structure, it is to be clearly understood that it is merely for purpose of illustration, and that changes and modification may readily be made therein by those skilled in the art, without departing from the spirit and scope of the appended claim.

What I claim is:

An apparatus for resiliently suspending a motorcycle wheel comprising a frame, wheel supporting arms having means at one end for carrying the wheel axle, means mounting said arms on the frame for swinging movement about an axis parallel to the wheel axle, a torsion rod carried by said frame with its axis parallel to the wheel axle and transversely spaced therefrom, means fixing a portion of said rod intermediate its ends against rotation relative to said frame, a crank arm fixed to each end of said torsion rod, a crank arm fixed to each of said wheel supporting arms, a link connecting the crank arm on one end of the rod to the crank arm on one of the wheel supporting arms, and a link connecting the crank arm on the other end of the rod to the crank arm on the other wheel supporting arm to transmit swinging movement of the wheel supporting arms to the ends of the torsion rod.

References Cited in the file of this patent

UNITED STATES PATENTS

| | | |
|---|---|---|
| 1,500,480 | Zichman | July 8, 1924 |
| 2,082,147 | Bryant | June 1, 1937 |
| 2,307,279 | Kranz | Jan. 5, 1943 |
| 2,401,869 | Halliday | June 11, 1946 |
| 2,446,731 | Wheeler | Aug. 10, 1948 |

FOREIGN PATENTS

| | | |
|---|---|---|
| 435,426 | Italy | May 17, 1948 |
| 485,605 | Great Britain | May 23, 1938 |
| 607,559 | Great Britain | Sept. 1, 1948 |
| 872,892 | France | June 22, 1942 |
| 975,011 | France | Oct. 4, 1950 |
| 975,517 | France | Oct. 11, 1950 |